Agee et al.

United States Patent [19]

[11] 3,886,221

[45] May 27, 1975

[54] PRODUCTION OF CHLORINATED HYDROCARBONS

[75] Inventors: Robert B. Agee, Baker; James E. Davis, Baton Rouge, both of La.

[73] Assignee: Ethyl Corporation, Richmond, Va.

[22] Filed: Mar. 14, 1974

[21] Appl. No.: 451,180

Related U.S. Application Data

[63] and a continuation-in-part of Ser. No. 196,803, Nov. 8, 1971, abandoned, which is a continuation-in-part of Ser. No. 750,833, Aug. 7, 1968, abandoned.

[52] U.S. Cl. .......................... 260/658 R; 260/658 R
[51] Int. Cl. ............................................ C07c 17/00
[58] Field of Search .............. 260/658 R; 204/163 R

[56] References Cited
UNITED STATES PATENTS

| | | | |
|---|---|---|---|
| 2,007,144 | 7/1935 | Nutting et al. ................... | 260/658 R |
| 3,012,081 | 12/1961 | Conrad et al. ................... | 260/658 R |
| 3,019,175 | 1/1962 | Haefner et al. .................. | 260/658 R |
| 3,059,035 | 10/1962 | Benner et al. .................... | 260/658 R |
| 3,304,337 | 2/1967 | Jordan et al. .................... | 260/658 R |

FOREIGN PATENTS OR APPLICATIONS

| | | | |
|---|---|---|---|
| 702,594 | 1/1965 | Canada ........................... | 260/658 R |

Primary Examiner—Delbert E. Gantz
Assistant Examiner—Joseph A. Boska
Attorney, Agent, or Firm—Donald L. Johnson; John F. Sieberth; Edgar E. Spielman, Jr.

[57] ABSTRACT

A process for the production of 1,1,1-trichloroethane by the production of a hydrochlorination product stream through reaction of vinyl chloride and hydrogen chloride and the production of a chlorination product stream by catalytic chlorination, photochlorination or thermal chlorination through reaction of chlorine and 1,1-dichloroethane, and the coincident processing of the two product streams to provide a chlorination feed stream of said 1,1-dichloroethane and substantially pure 1,1,1-trichloroethane product. The hydrochlorination product stream is formed by withdrawing 1,1-dichloroethane as a liquid from a hydrochlorination reactor and withdrawing unreacted hydrogen chloride and vinyl chloride from the same reactor as vapors.

5 Claims, 1 Drawing Figure

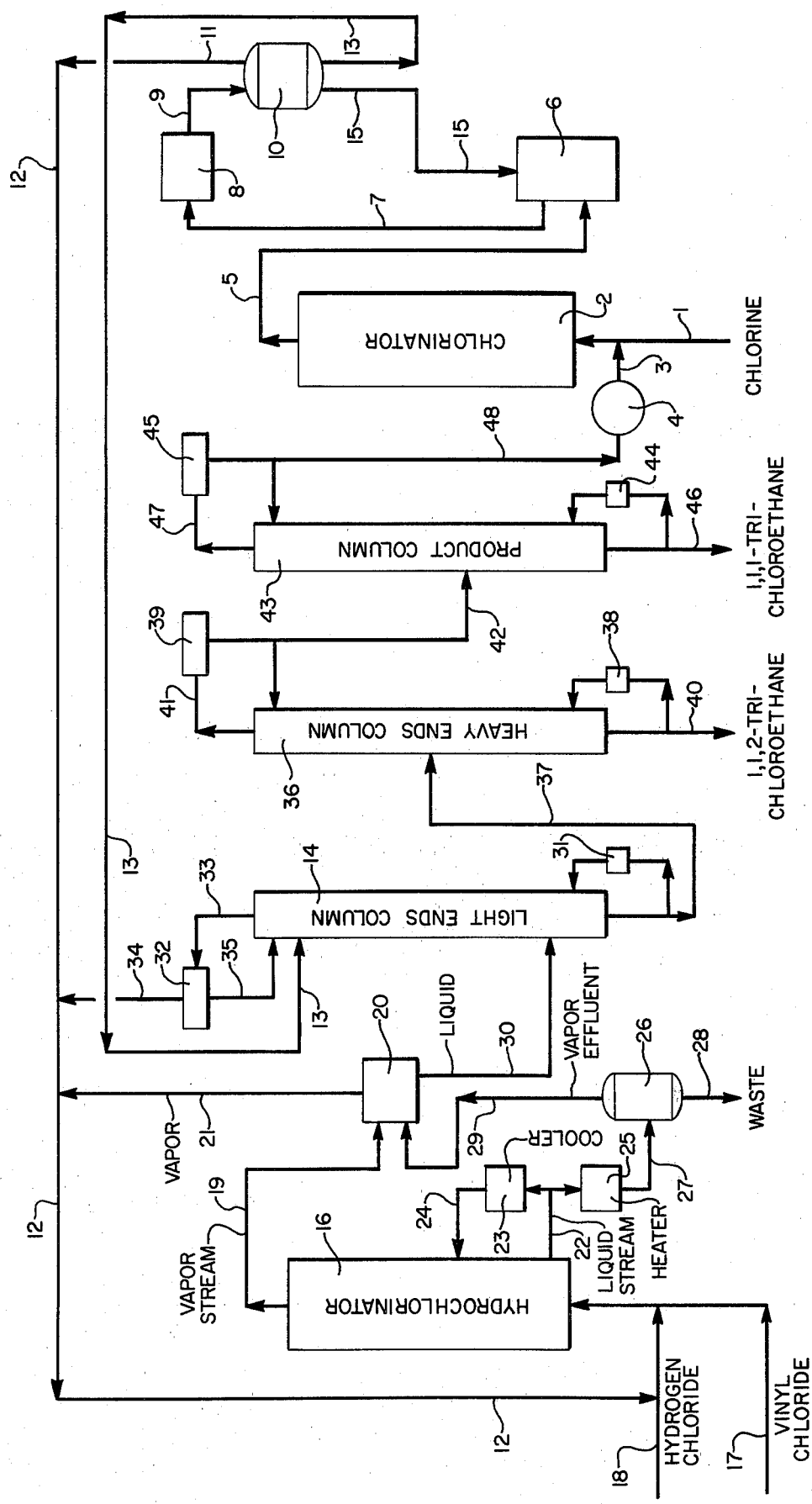

PRODUCTION OF CHLORINATED HYDROCARBONS

CROSS REFERENCE TO RELATED APPLICATIONS

This application is a continuation-in-part of our co-pending application Ser. No. 196,803, filed Nov. 8, 1971, now abandoned, which is a continuation-in-part of our application Ser. No. 750,833, filed Aug. 7, 1968, now abandoned.

BACKGROUND OF THE INVENTION

Various processes are known for the manufacture of 1,1,1-trichloroethane (also known as methyl chloroform) though such processes generally possess serious disadvantages. Such disadvantages include low yields of 1,1,1-trichloroethane, low conversion of raw materials to 1,1,1-trichloroethane, high catalyst comsumption, high carbonization of reagents, complex equipment, multistage reactors and the like. One specific problem of great seriousness often encountered is the contamination of the 1,1,1-trichloroethane with relatively large amounts of materials such as 1,2-dichloroethane which are difficult to remove due to similarities in volatility. Another serious problem encountered is contamination of the product with catalytic material. Such impurities should be removed or minimized because they result in inferior quality product.

In an effort to solve these problems the industry has developed various 1,1,1-trichloroethane processes. An example of such processes is the one disclosed in French Pat. No. 1,440,437. This process, while being a great advance over the prior art, is not a panacea to all of the various problems encountered in the production of 1,1,1-trichloroethane. Also, the art has often utilized a complex and expensive process arrangement involving many different stages, steps or unit operations in order to obtain a pure product.

The present invention provides a process for the production of 1,1,1-trichloroethane which avoids the foregoing and many other defects and which possesses outstanding advantages. More particularly, it provides an efficient process for the production of 1,1,1-trichloroethane which does not favor the formation of large quantities and varieties of by-products. Also, it provides a continuous process for the production of 1,1,1-trichloroethane which is capable of long periods of operation without the necessity of shutting down for cleanout or other maintenance. Further, it provides a process which produces substantially pure 1,1,1-trichloroethane and which is simpler in its arrangement than other processes heretofore known. Even more particularly, the present invention provides an improvement of a specific unit process, namely hydrochlorination, of the overall improved process. Through improved hydrochlorination, the present invention greatly enhances all of the above discussed advantages of the overall process.

SUMMARY OF THE INVENTION

The present invention provides a process for the production of substantially pure 1,1,1-trichloroethane comprising, in combination, the production of a liquid hydrochlorination product stream and a liquid chlorination product stream, and the coincident processing of the two product streams to provide a chlorination feed stream and substantially pure 1,1,1-trichloroethane; the production of the liquid hydrochlorination product stream comprising, in combination, the steps of, reacting hydrogen chloride and vinyl chloride in a hydrochlorination zone to produce 1,1-dichloroethane and unreacted hydrogen chloride and vinyl chloride; removing, from the hydrochlorination zone, as a liquid reactor stream, part of said 1,1-dichloroethane along with polymers and catalysts and, as a vapor reactor stream, the remaining part of said 1,1-dichloroethane, which vapor reactor stream also includes most of said unreacted vaporous hydrogen chloride and vinyl chloride; cooling a part of the liquid reactor stream in a cooling zone and recycling this cooled stream back to the hydrochlorination zone; heating the remainder of the liquid reactor stream to form a vapor effluent of 1,1-dichloroethane and a liquid effluent of polymer and catalyst; separating the liquid effluent from the vapor effluent; and combining the removed vapor effluent and the aforesaid vapor reactor stream in a condensation zone where the combination is partially condensed to yield said liquid hydrochlorination product stream.

The production of said liquid chlorination product stream comprises, as in French Pat. No. 1,440,437, the steps of reacting chlorine and at least part of said chlorination feed stream of 1,1-dichloroethane in a chlorination zone to yield 1,1,1-trichloroethane, hydrogen chloride and unreacted 1,1-dichloroethane; removing at least part of said 1,1,1-trichloroethane and hydrogen chloride and unreacted 1,1-dichloroethane from said chlorination zone; and separating said 1,1,1-trichloroethane and unreacted 1,1-dichloroethane from said hydrogen chloride to produce said liquid chlorination product stream.

The coincident distillation of the two product streams together, also as in French Pat. No. 1,440,437, includes the combination of: introducing said liquid hydrochlorination product stream to a distillation zone; also introducing said liquid chlorination product stream to the zone; withdrawing substantially pure 1,1,1-trichloroethane from said zone; and also withdrawing said chlorination feed stream from said zone.

BRIEF DESCRIPTION OF THE DRAWING

The process of the present invention is shown schematically in the drawing.

DESCRIPTION OF THE PREFERRED EMBODIMENTS

The present invention is carried out by: introducing a 1,1-dichloroethane feed stream into a chlorination zone so as to effect at least partial chlorination thereof to produce a first product stream of 1,1,1-trichloroethane, 1,1-dichloroethane, hydrogen chloride and associated by-products; concurrently hydrochlorinating vinyl chloride to 1,1-dichloroethane in a separate hydrochlorination reaction zone to produce a pair of second product streams, that is a liquid reactor stream of 1,1-dichloroethane, catalyst and polymer and a vapor reactor stream of 1,1-dichloroethane, unreacted hydrogen chloride and vinyl chloride, and associated by-products; cooling a part of the liquid reactor stream in a cooling zone and recycling this cooled stream back to the hydrochlorination reaction zone; heating the remainder of the liquid reactor stream to form a vapor effluent of 1,1-dichloroethane and a liquid effluent of polymer and catalyst; separating and removing the liquid effluent from the vapor effluent; and combining the removed vapor effluent and the aforesaid vapor reactor stream in a condensation zone where the combination is partially condensed to yield a liquid hydrochlorination product stream; coincident processing of the first product stream and the liquid hydrochlorination product stream by simultaneously introducing the first product stream and the liquid hydrochlorination product stream into a light ends distillation column for distillation of the two streams together and withdrawing an enriched 1,1-dichloroethane and 1,1,1-trichloroethane stream as the bottoms of said light ends distillation column; introducing said bottoms into a heavy ends distillation column and withdrawing therefrom an essentially pure 1,1-dichloroethane and 1,1,1-trichloroethane distillate; introducing said distillate into a product distillation column, thereby effecting separation between 1,1-dichloroethane and 1,1,1-trichloroethane, the separated 1,1-dichloroethane being utilized as said 1,1-dichloroethane feed stream to the chlorination zone; and recovering 1,1,1-trichloroethane from the product column. As can be appreciated, portions of the various distillate and bottoms can be recycled for reflux or reboiling respectively.

For a more thorough understanding of the present invention, reference is made to the accompanying drawing, which is a diagrammatic illustration of a system which may be suitably employed to conduct the process as hereinafter described. As shown in the drawing, according to one embodiment elemental chlorine is fed via line 1 into a chlorination reaction zone 2 together with stream 3 of preheated and vaporized 1,1-dichloroethane. The 1,1-dichloroethane is heated in preheater 4 to a sufficient temperature so that a stabilized reaction with chlorine results. In other words, preheating provides a reaction in which the reaction system is thermodynamically balanced such that it is unnecessary to supply additional heating or to remove excess heat from the reaction zone. It is generally necessary to preheat the 1,1-dichloroethane feed to a temperature of from about 100° to about 500°F. A more preferred preheating temperature is from about 300° to about 450°F since under these conditions by-product formation is minimized and high yields are achieved. The feed to the chlorination zone is adjusted so that a molar ratio of chlorine to 1,1-dichloroethane is provided and maintained within from about 0.2:1 to about 0.7:1 and preferably within from about 0.25:1 to about 0.35:1. The chlorine to 1,1-dichloroethane ratio which will provide a stable reaction temperature is closely related to the temperature imposed upon the 1,1-dichloroethane feed. Thus, the quantity of heat given off by the exothermic substitution chlorination reaction plus the heat provided to the 1,1-dichloroethane feed is sufficient to provide a stabilized reaction within the zone. The chlorination reaction is stabilized at a temperature uniform throughout a fluidized bed of from about 600° to about 800°F and preferably at a temperature of from about 650°F to about 750°F. The reaction can be conducted from about atmospheric pressure up to about 300 psig. An excellent operating pressure is from about 40 to about 80 psig.

While thermal chlorination is most preferably adiabatic as described above, the process of this invention may be conducted to advantage under non-adiabatic conditions, i.e., heat may be added to or removed from the reactor bed. The fluidized bed in this chlorination zone is preferably composed of fine sand into which the reaction gases are passed and reacted. For best results the sand should be substantially free of nickel and iron and their compounds. The gases are introduced into the bed at such velocity that good fluidization and heat transfer from the reaction gases to the sand occur. The only limitation regarding the velocity of the entering gases is that the velocities be compatible with the type of sand employed and the reactor design used. To provide proper fluidization for fine sand, it is generally preferable that the superficial linear velocity of the gases entering the reaction zone be maintained at from about 0.1 to about 2.0 feet per second. Where cyclone separators are provided to collect and return the sand, gas velocities greater than 2 feet per second can be used. It is generally more preferable however that the velocity be maintained within the range of from about 0.5 to about 1.5 feet per second.

The present invention is not limited to thermal chlorination. Other types of chlorination reactions which are highly suitable include photochlorination and catalytic low temperature chlorination. Photochemical chlorination may be conducted at from about ambient to 200°C and from about atmospheric pressure up to 300 psig. Catalytic chlorination may be conducted at from about ambient to 250°C and from about atmospheric pressure up to 300 psig. Unlike thermal chlorination, both photochlorination and catalytic chlorination avoid undesirable cracking to produce unsaturated chloroethanes and associated by-products. For example, 1,1,1-trichloroethane and 1,1-dichloroethane may be cracked during thermal chlorination to produce either vinylidene chloride or vinly chloride, which are then chlorinated, respectively, to unsymmetrical tetrachloroethane and 1,1,2-trichloroethane.

The product mixture from the chlorination zone is passed through line 5 into quench zone 6. This product stream contains 1,1,1-trichloroethane and unreacted 1,1-dichloroethane and associated by-products, primarily hydrogen chloride and lesser portions of other by-product compounds. Vessel 6 may be referred to as the thermal chlorinator quench drum or vessel and is preferably an unpacked vessel, but may if desired, be packed with some suitable material of high surface area such as Raschig rings. The gaseous quench stream from vessel 6 is passed via line 7 to condenser 8 and at least partially condensed. Condenser 8 is conveniently referred to as the thermal chlorinator condenser. The partially condensed stream from condenser 8 is passed into knock-out drum 10 or vessel from which hydrogen chloride produced in the chlorinator is removed. This gaseous hydrogen chloride is preferably utilized to at least partially fulfill the hydrogen chloride requirements of the hydrochlorinator. The remaining partially condensed stream, i.e., the liquid in knock-out drum 10, is transferred or recycled from knock-out drum 10 to the light ends column via line 13. A portion of the liquid in the knock-out vessel preferably is transferred to vessel 6 via line 15 to provide the quench liquid. That portion of the quench liquid which is vaporized will be sent to condenser 8 via line 7 along with the gaseous quench stream. It can be seen from the foregoing that the operative essence of the chlorinator product stream treatment train, i.e., line 5, quench vessel 6, line 7, condenser 8, line 9, knock-out drum 10, lines 11, 15 and 13 is to cool and separate the thermal chlorinator product stream into principally a hydrogen chloride portion and a liquid portion, the latter being hereinafter referred to as the chlorinator product liquid or as the liquid chlorination product stream. The chlorinator product liquid is primarily composed of 1,1-dichloroethane, 1,1,1-trichloroethane and minor amounts of hydrogen chloride and other by-products. Other modes of achieving this cooling and separating of the resultant vapor from the liquid may be used in conjunction with the process of this invention.

Hydrochlorinator 16 is a reaction vessel adapted to handling materials such as hydrogen chloride. This vessel is preferably constructed of steel or similar material and may be lined with glass or polytetrafluoroethylene. Vinyl chloride is fed into the lower portion of the hydrochlorinator via line 17. The vinyl chloride may be fed at ambient temperatures or may be preheated up to about 100°F. Substantially gaseous hydrogen chloride is fed into the hydrochlorinator through line 18. The hydrogen chloride may be fed separately into the hydrochlorinator but is preferably premixed with the vinyl chloride as shown in the diagram. Preferably this hydrogen chloride is at least partially provided by the hydrogen chloride produced in the chlorination zone and supplied through line 12. In a preferred embodiment substantially all of the hydrogen chloride requirements are proficed by the hydrogen chloride generated within the system itself. In order to have good conversion of vinyl chloride, a molar excess of hydrogen chloride is utilized. In mole percent this excess may range up to 150 and preferably from about 50 to about 100 percent excess. A Friedel-Crafts catalyst such as aluminum chloride or iron chloride is charged into the hydrochlorinator prior to start-up. However, iron chloride is preferred. The reaction temperature within the hydrochlorinator ranges from about 50° to about 250°F and preferably from about 100° to about 200°F and more preferably from about 100°F to about 125°F. Preferably the pressure within the hydrochlorination zone is from about 25 to about 90 psig. However, pressures up to 300 psig may be effectively utilized. The mixture within the hydrochlorinator is substantially a liquid phase mixture composed of the reactants, the catalyst, the products and associated byproducts produced therein.

Vapor is removed from the hydrochlorinator via line 19 and contains predominantly vinyl chloride and hydrogen chloride with some 1,1-dichloroethane. This withdrawn vapor from the hydrochlorinator is fed to condensation zone 20. This condensation zone may be a single or multistage arrangement of condensers wherein the hydrochlorinator stream is at least partially condensed and wherein hydrogen chloride and vinyl chloride vapors are vented and/or withdrawn via line 21 and then separated from the condensed 1,1-dichloroethane. The vapors are preferaby recycled to the hydrochlorinator through line 12. Line 21 may be provided with a compressor where needed.

Liquid removed via line 22, is predominantly 1,1-dichloroethane along with polymer formed in the hydrochlorination reaction and catalyst which, by this time is largely spent. Part of stream 22 is cooled in heat exchanger 23 and returned via line 24 to the hydrochlorinator for purposes of temperature control of the reaction. Cooling water may be used as a cooling medium in exchanger 23. The remainder of stream 22 is processed by heating the stream to yield a vapor containing 1,1-dichloroethane and liquid containing polymer and catalyst and subsequently separating the liquid and vapor. This processing is preferably achieved by the mode shown in the drawing in which stream 22 is processed in a polystill by heating it in heat exchanger 25 and passing it into knock-out drum 26 via line 27. Steam may be used as a heating medium in exchanger 25. In knock-out drum 26 polymer and spent catalyst are removed through line 28 as a liquid and sent to waste disposal, while 1,1-dichloroethane and other vapors are sent to condensation zone 20 through line 29 in which zone essentially all of the 1,1-dichloroethane is condensed. The non-condensed vapors are withdrawn via line 21.

The condensed portion in the condenser, which portion includes that resulting from the feeds from lines 29 and 19, is passed via line 30 to the light ends distillation column. This portion is hereinafter referred to as the liquid hydrochlorination product stream.

Light ends column 14, which is a distillation column supplied with reboiler 31, overhead condenser 32 and distillation trays or the equivalent of distillation trays such as packing, receives the predominantly liquid 1,1-dichloroethane stream, i.e., the liquid hydrochlorination product stream, from condensation zone 20 via line 30. Light ends vapors are withdrawn from the light ends column via line 33. This stream is conveniently referred to as the light ends column overhead and is composed primarily of hydrogen chloride, vinyl chloride, 1,1-dichloroethane and lesser amounts of other compounds. The hydrogen chloride and vinyl chloride of the light ends column overhead are preferably recycled back to the hydrochlorinator by means of lines 34 and 12, and the liquids are returned to the column through line 35. The bottoms from the light ends column are withdrawn therefrom and fed into heavy ends column 36 via line 37. This stream is conveniently referred to as the heavy ends column feed and is composed primarily of 1,1,1-trichloroethane, 1,1-dichloroethane and lesser amounts of other by-products.

As noted above, the chlorinator product liquid and the liquid hydrochlorinator product stream are fed into the light ends column, the former via line 13 and the latter via line 30. The point of addition for these streams to the light ends column is not critical. For example, the chlorinator product liquid can be fed to the upper portion of the light ends column with the liquid portion of the hydrochlorinator product stream being fed to the bottom portion of the column as is shown in the drawing. Another type of addition which would be useful is that addition wherein both the chlorinator product liquid and the liquid hydrochlorinator product stream are fed together into the bottom portion of the column. The preferred point of addition for the chlorinator product liquid is the upper portion of the column as shown in the drawing.

The heavy ends column is a distillation column supplied with a reboiler 38, a condenser 39 and distillation trays or the equivalent of distillation trays. The heavy ends are withdrawn from the heavy ends column via line 40. The composition of the heavy ends bottoms is 1,1,2-trichloroethane and other by-products. This stream is disposed of or used in other plant facilities. The overhead stream from the heavy ends column is withdrawn through line 41, at least partially condensed in condenser 39, and at least partially refluxed, the remainder being fed via line 42 to product column 43. The heavy ends overhead product stream (the product column feed) as fed to the product column is composed of primarily 1,1-dichloroethane and 1,1,1-trichloroethane.

The product column is a distillation column supplied with a reboiler 44, an overhead condenser 45 and fitted with distillation trays or their equivalent such as packing, etc. Bottoms stream 46 from the product column is the primary product stream of the present process and is composed of substantially essentially pure 1,1,1-trichloroethane. This stream is cooled and transferred to another area for stabilization, storage and processing for marketing. Overhead 47 from the product column is withdrawn, condensed or at least partially condensed in condenser 45, and at least partially refluxed, the remainder being transferred via line 48 to preheater 4; then it is passed from the preheater to the thermal chlorinator as above described. This product column overhead stream is composed primarily of 1,1-dichloroethane and minor amounts of other chlorinated hydrocarbons.

In order that those skilled in the art can thus appreciate the process of this invention, the following example is given by way of description and not by way of limitation.

EXAMPLE

In the following example, the process equipment, piping, reactors, condensers and the like were arranged in a manner similar to that depicted in the schematic drawing except as otherwise indicated.

Gaseous chlorine was premixed with the overhead from the product column (thermal chlorinator feed) and the mixture so formed fed into a reaction vessel or thermal chlorinator. The thermal chlorinator had been precharged with Ottawa sand which was, during normal operations, suspended in a fluidized state. The thermal chlorinator feed (or overhead from the products column) was preheated to a temperature of 400°F in a furnace prior to mixing with chlorine feed. The temperature in the fluidized chlorination zone was stabilized at 700°F and 50 psig. During lengthy continuous operations it was unnecessary to supply heat to or remove heat from the thermal chlorinator; in other words, the chlorination step was substantially adiabatic.

A reaction product was withdrawn from the thermal chlorinator at about 675°F and charged into a quench drum wherein the temperature of the material was reduced to about 225°F. The partially cooled stream was passed from the quench drum into a water cooled condenser wherein the stream was partially condensed. The partially condensed stream from the condenser was passed into a knock-out vessel wherein the non-condensables were removed. These non-condensables, composed primarily of hydrogen chloride, were withdrawn from the knock-out drum and recycled into the hydrochlorinator. The hydrogen chloride recycled from the thermal chlorinator knock-out drum provided a major portion of the hydrogen chloride feed requirements for the hydrochlorinator. The condensed stream was passed from the thermal chlorinator knock-out drum and recycled to an upper portion of the light ends column. A portion of the liquid in the thermal chlorinator knock-out drum provided the quench liquid for the quench drum.

Vinyl chloride at a temperature of 80°F and pressure of 46 psig was premixed with a hydrogen chloride stream and fed into a hydrochlorination reaction vessel. During normal operations substantially all of the hydrogen chloride requirements were provided by the hydrogen chloride generated within the system itself. During continuous operation the hydrochlorinator contained a liquid phase composed of the reactants, products and iron chloride catalyst. Makeup catalyst was added to the hydrochlorinator in small quantities as needed. The hydrochlorination reaction was conducted at 125°F and 25 psig. A liquid stream predominantly of 1,1-dichloroethane and including some polymer and spent catalyst was withdrawn from the reactor. To control temperature within the reactor, part of this liquid stream was cooled to 100°F and returned to the reactor. The remainder of the liquid stream was passed to a polystill and heated to 225°F. to form a vapor effluent and a liquid effluent. Polymer and spent catalyst were removed in the liquid effluent and sent to waste disposal. 1,1-Dichloroethane and lesser amounts of other materials in the vapor effluent were passed to a condensation zone composed of two condensers along with a vapor stream from the reactor composed predominantly of vinyl chloride and hydrogen chloride with some 1,1-dichloroethane. Material contained within the stream such as hydrogen chloride and minor amounts of other materials were removed as vapors, compressed, and recycled to the hydrochlorinator. The condensed material from the condensation zone was fed into a light ends column. The light ends column was a tray distillation type column fitted with an overhead condenser and a steam reboiler. The condensed material from the hydrochlorinator was fed into the column near the bottom.

The condensed stream from the thermal chlorinator condenser was also passed into the light ends column near the top. The light ends column overhead vapors were recycled to the hydrochlorinator, and the bottoms from the light ends column was fed to the heavy ends column. The heavy ends column was a tray distillation type column fitted with an overhead condenser and a steam reboiler. The feed from the light ends column was introduced near the center. During operation, the temperature of the bottoms was 250°F and the overhead 160°F; the pressure in the overhead was 5 psig. The bottoms from the heavy ends column was withdrawn and sent to disposal. The overhead from the heavy ends column was condensed and fed into the product column. The product column was a tray distillation type column operating at a bottoms temperature of 200°F and an overhead temperature of 150°F. The column was fitted with a steam reboiler and an overhead condenser. The material from the top of the product column was condensed, preheated and fed to the thermal chlorinator. Substantially pure 1,1,1-trichloroethane was withdrawn as the product from the first tray of the product column, condensed and sent to storage.

82.0 Percent of the vinyl chloride fed into the hydrochlorination zone was converted into 1,1,1-trichloroethane, based on moles of vinyl chloride fed and moles of 1,1,1-trichloroethane recovered.

Analysis of the product demonstrated that it contained 99.30 mole percent 1,1,1-trichloroethane, 0.31 mole percent 1,1-dichloroethane, 0.35 percent trichloroethylene, and 0.04 percent cis-1,2-dichloroethylene.

It is to be understood that the present invention is not limited by the specific embodiments described hereinabove, but includes such changes and modifications as may be apparent to one skilled in the art upon reading the appended claims.

What is claimed is:

1. In a process for producing substantially pure 1,1,1-trichloroethane which includes the concurrent formation of a liquid hydrochlorination product stream and a liquid chlorination product stream, said liquid hydrochlorination product stream being predominantly 1,1-dichloroethane produced in a catalytic hydrochlorination zone by the reaction of vinyl chloride and hydrogen chloride at from about 50° to about 250°F and at a pressure up to 300 psig followed by separation of vapors, polymers and catalyst from the hydrochlorination products; and said liquid chlorination product stream being primarily 1,1,1-trichloroethane and 1,1-dichloroethane produced in a chlorination zone by the reaction of chlorine and 1,1-dichloroethane at from about 600° to about 800°F and at a pressure up to 300 psig followed by removal of vapor from the chlorination product and coincident distilling of said liquid hydrochlorination product stream and said liquid chlorination product stream together in a distillation zone to yield the substantially pure 1,1,1-trichloroethane, the improvement which comprises producing said liquid hydrochlorination product stream for distillation by:
   1. withdrawing from the hydrochlorination zone a vapor stream and a liquid stream, the vapor stream containing 1,1-dichloroethane, hydrogen chloride and vinyl chloride, and the liquid stream containing 1,1-dichloroethane, polymer and catalyst;
   2. cooling a part of the liquid stream in a cooling zone and recycling this cooled part back to the hydrochlorination zone;
   3. heating the remainder of the liquid stream to form a vapor effluent containing 1,1-dichloroethane and a liquid effluent containing polymer and catalyst;
   4. separating the liquid effluent from the vapor effluent; and
   5. combining the separated vapor effluent and the aforesaid vapor stream in a condensation zone wherein the combined vapors are partially condensed to yield said liquid hydrochlorination product stream which is predominantly 1,1-dichloroethane for said coincident distillation.

2. The process of claim 1 wherein the uncondensed vapor mixture in the condensation zone contains hydrogen chloride and vinyl chloride and is passed to the hydrochlorination zone as feed thereto.

3. The process of claim 2 in which a molar excess of hydrogen chloride is present in the hydrochlorination zone.

4. The process of claim 1 wherein the separation of the liquid effluent from the vapor effluent is achieved by passing the effluents to a knock-out drum and separating from such drum the vapor effluent and the liquid effluent.

5. The process of claim 1 wherein the hydrochlorination zone is operated at a temperature within a range of from about 100° to about 200°F and at a pressure within the range of from about 25 to about 90 psig.

* * * * *